(12) United States Patent
Bhagavatheeswaran et al.

(10) Patent No.: US 7,463,862 B2
(45) Date of Patent: Dec. 9, 2008

(54) METHODS AND APPARATUS TO INTEGRATE IMAGE REJECTION INTO QUADRATURE MIXERS

(75) Inventors: Shanthi Bhagavatheeswaran, Dallas, TX (US); Srinivasan Venkatraman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 374 days.

(21) Appl. No.: 11/151,105

(22) Filed: Jun. 13, 2005

(65) Prior Publication Data

US 2006/0281410 A1    Dec. 14, 2006

(51) Int. Cl.
*H04B 1/00*    (2006.01)
*H04B 7/00*    (2006.01)

(52) U.S. Cl. .................. 455/42; 455/63.1; 455/285; 455/302

(58) Field of Classification Search .................. 455/42, 455/63.1, 67.11, 285, 226.1, 296, 302, 307
See application file for complete search history.

(56) References Cited

U.S. PATENT DOCUMENTS 6,975,838 B1 *  12/2005  Rofougaran et al. .......... 455/20

OTHER PUBLICATIONS

Crols et al., *Low-IF Topologies for High-Performance Analog Front Ends of Fully Integrated Receivers*, IEE Transactions on Circuits and Systems-II: Analog and Digital Signal Processing, vol. 45, No. 3, Mar. 1998 (14 pages).

* cited by examiner

*Primary Examiner*—Nay Maung
*Assistant Examiner*—Tuan H Nguyen
(74) *Attorney, Agent, or Firm*—Ronald O. Neerings; Wade James Brady, III; Frederick J. Telecky, Jr.

(57) ABSTRACT

Methods and apparatus to integrate image rejection into quadrature mixers are disclosed. A disclosed image-rejection quadrature mixer comprises a quadrature mixer, and a cross-coupled differential pair of transistors to provide a complex filter response, wherein the mixer and the transistors are integrated on a common silicon substrate.

10 Claims, 4 Drawing Sheets

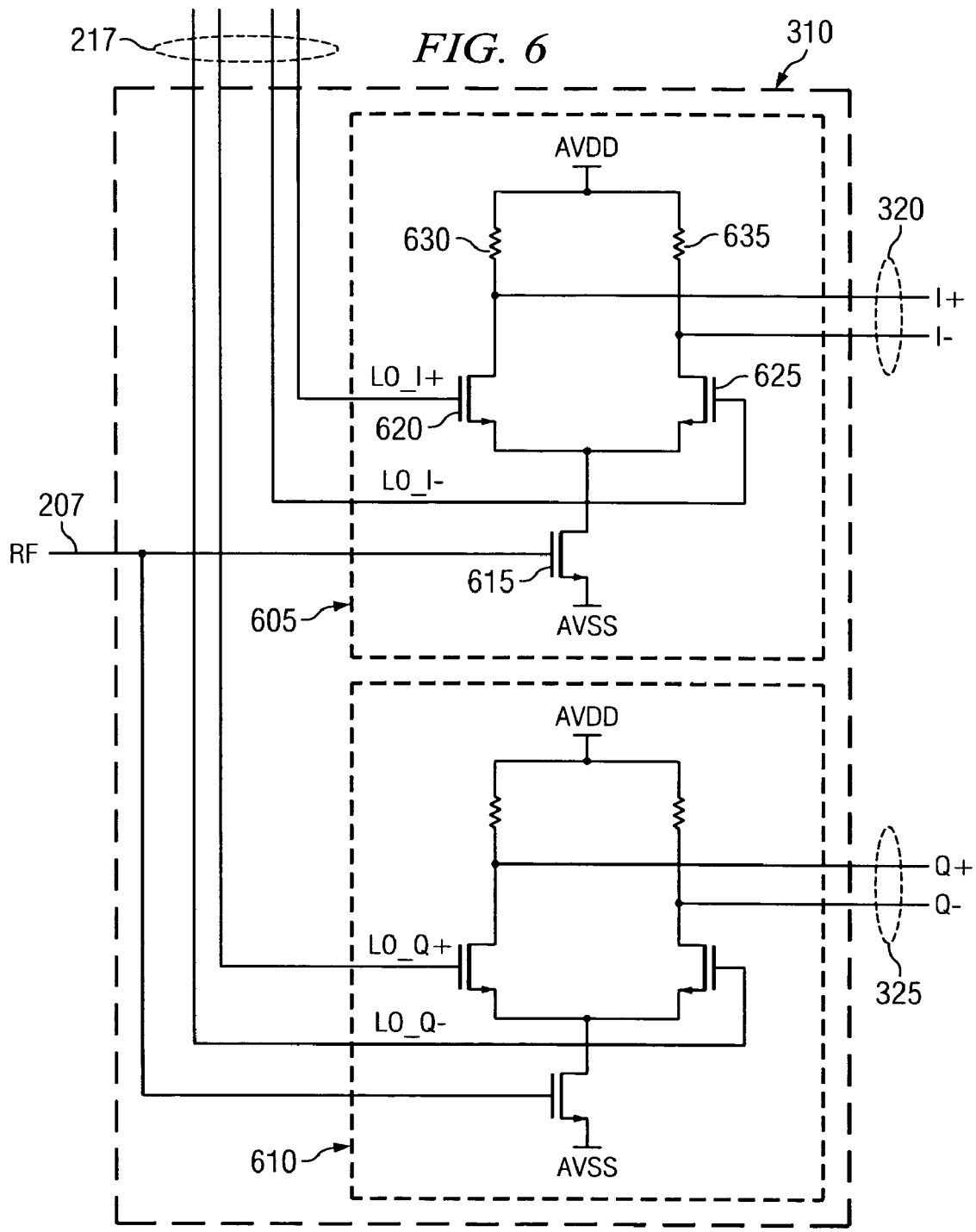

METHODS AND APPARATUS TO INTEGRATE IMAGE REJECTION INTO QUADRATURE MIXERS

FIELD OF THE DISCLOSURE

This disclosure relates generally to quadrature mixers, and, more particularly, to apparatus and methods to integrate image rejection into quadrature mixers.

BACKGROUND

In traditional heterodyne receivers, a desired signal is downconverted from a carrier frequency to an intermediate frequency (IF) by multiplying a receive signal (that contains the desired signal) with a single sinusoidal signal. One significant disadvantage of a traditional heterodyne receiver is that, in addition to the desired signal, an interfering signal is also downconverted to the IF as illustrated in FIG. 1a. In the example of FIG. 1a, the desired signal 105 and the interfering signal 110 contain frequencies approximately equal distant from a local oscillator frequency 115 used to downconvert the desired signal 105. Thus, a downconverted desired signal 120 is located at an IF 125, however, a downconverted interfering signal 130 (caused by downconversion of the interfering signal 110) falls on top of the downconverted desired signal 120 creating undesirable interference.

To reduce or prevent interference between the downconverted interfering signal 130 and the downconverted desired signal 120, the interfering signal 110 should be suppressed prior to downconverting the desired signal 105. In general, for a desired signal 105 containing frequencies in a range $$f_c - \tfrac{1}{2}f_s \leq f \leq f_c + \tfrac{1}{2}f_s, \qquad \text{(Equation 1)}$$

where $f_c$ is a center (i.e., carrier) frequency of the desired signal 105 and $f_s$ represents a spectral width of the desired signal 105, interfering signals in a frequency range of $$f_c - \tfrac{1}{2}f_s - 2f_i \leq f \leq f_c + \tfrac{1}{2}f_s - 2f_i \qquad \text{(Equation 2)}$$

will interfere with the downconverted desired signal 120, where $f_i$ is the IF 125. Interfering signals in the range of frequencies expressed mathematically by Equation 2 (i.e., mirror frequencies) are typically suppressed using a filter having a high pass filter (HPF) or a band pass filter (BPF) response located prior to the mixer. However, the filter, requiring a very high Q, high order, low noise, etc., is difficult to implement unless $f_i$ is large such that the mirror frequencies are sufficiently separated from the desired signal 105.

To eliminate the need for a high-order high-Q filter to suppress mirror frequencies prior to downconversion, low-IF receivers are often implemented. In a typical low-IF receiver, the local oscillator frequency 115 used to downconvert the desired signal 105 has a frequency slightly offset (e.g., by a few hundred kilohertz (kHz)) from the carrier frequency $f_c$. In an example, where the local oscillator frequency 115 is slightly lower than the carrier frequency $f_c$, the desired signal 105 and a mirror signal (i.e., a signal containing frequencies falling within the mirror frequencies) are downconverted, and the resulting downconverted signals are no longer superimposed, as illustrated in FIG. 1b. Instead, a downconverted desired signal 120b is situated at positive frequencies very close to direct current (DC), while a downconverted mirror signal 130b (i.e., a downconverted interfering signal) is situated at negative frequencies very close to DC. The downconverted signals can then be filtered using a complex filter (i.e., a filter having a transfer characteristic that is different for positive and negative frequencies) having a band-pass filter response 135 (i.e., a shifted low-pass filter, centered at an IF 125b) to suppress the mirror signal 130b.

FIG. 2 illustrates a portion of a prior-art example low-IF quadrature receiver 200 that receives a radio frequency (RF) signal 207 provided by an antenna 202 and a RF receiver 205 (containing, e.g., automatic gain control, a low noise amplifier, filters, etc.). To downconvert the RF signal 207, the quadrature receiver 200 includes a mixer 210 and a local oscillator 215. As discussed above, the mixer 210 downconverts the RF signal 207 by multiplying (i.e., mixing) the RF signal 207 with sinusoidal signals 217 provided by the local oscillator 215. The sinusoidal signals 217 provided by the local oscillator 215 include a first sinusoidal signal and a second sinusoidal signal. The second sinusoidal signal is 90 degrees out of phase relative to the first sinusoidal signal. The frequency of the first and second sinusoidal signals is slightly lower than the carrier frequency $f_c$.

As is well known to persons of ordinary skill in the art, the mixer 210 multiplies the RF signal 207 with the first sinusoidal signal to create an in-phase signal 218 (i.e., I), and multiplies the RF signal 207 with the second sinusoidal signal to create a quadrature signal 219 (i.e., Q). To remove an unwanted mirror signal, the quadrature receiver 200 includes a filter 220. The filter 220 includes, among other things, a complex filter (not shown) that realizes a band-pass filter response suitable for suppressing an unwanted mirror signal (situated at negative frequencies). A known method of implementing the complex filter uses a well-known prior-art polyphase filter.

A typical quadrature receiver 200 employs well-known differential signals rather than single-ended signals. For example, the in-phase signal 218 is constructed using a positive signal and a negative signal, where opposite currents are carried on the two signals, rather than being comprised of a single signal referenced to analog ground. The advantages of, and techniques for, using differential signals are well known to persons of ordinary skill in the art. It is assumed in the following discussions, unless stated otherwise, that signals are differential.

Despite the elimination of the high-order high-Q filter, the low-IF quadrature receiver 200 of FIG. 2 has several practical disadvantages. For example, the mirror signal 130b can have a signal level greater than the desired signal 120b, thereby, requiring additional signal headroom support in the mixer 210. In some circumstances, the mirror signal 130b can be 30 decibels (dB) higher than the desired signal 120b, thus, requiring 70 dB of mirror signal suppression to achieve a signal-to-noise ratio (SNR) of 40 dB; and significantly increasing the dynamic range, linearity, and power consumption that must be supported in the mixer 210 and the filter 220. For these, and additional, reasons, design and implementation of the low-IF quadrature receiver 200 of FIG. 2 is often challenging.

BRIEF DESCRIPTION OF THE DRAWINGS

FIG. 6 is a schematic illustration of an example manner of implementing the mixer of FIG. 3.

DETAILED DESCRIPTION

Figure 1A:
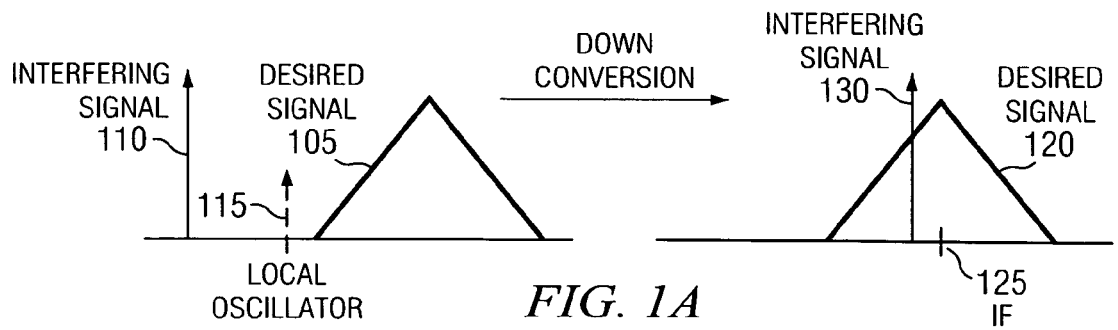
FIGS. 1a and 1b illustrate example scenarios involving a desired signal and an interfering signal resulting from a prior-art quadrature mixer.
Figure 1B:
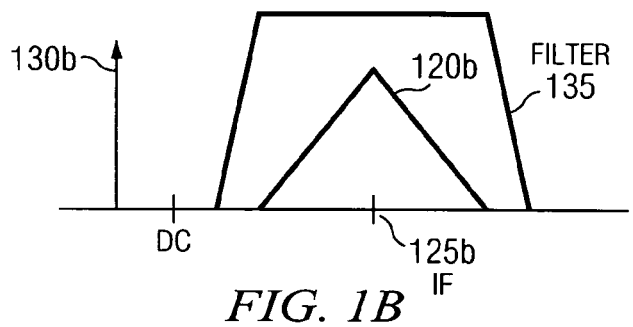

As discussed above, the filter 220 of FIG. 2 must meet strict image rejection, dynamic range, and linearity requirements to maintain a sufficient SNR for the received RF signal 207. FIG. 3 is a schematic diagram of an example low-IF quadrature receiver (LIFQR) 300 constructed in accordance with the teachings of the invention. To facilitate a reduction in the requirements (as compared to the filter 220 of FIG. 2) for a filter 302, and to reduce the implementation complexity for a mixer 310, the example LIFQR 300 includes an integrated image-rejection quadrature mixer 305 that integrates an image-rejection filter response. In the illustrated example of FIG. 3, the LIFQR 300 is comprised of the quadrature mixer 310 and an active load 315. In the illustrated example, the quadrature mixer 310 and the active load 315 integrated into the quadrature mixer 310 are realized in complimentary metal oxide semiconductor (CMOS) on a common silicon substrate. However, it will be readily apparent to persons of ordinary skill in the art that the integrated image-rejection quadrature mixer 305 could be realized in other appropriate analog semiconductor processes (e.g., Silicon Germanium (SiGe), Bipolar CMOS, etc.).

The quadrature mixer 310 downconverts the RF signal 207 by multiplying (i.e., mixing) the RF signal 207 with the first sinusoidal signal (that is part of the sinusoidal signal 217) to thereby create an in-phase signal 320 (i.e., I), and by multiplying the RF signal 207 with the second sinusoidal signal (that is also part of the sinusoidal signal 217 and is 90 degrees out of phase relative to the first sinusoidal signal) to thereby create a quadrature signal 325 (i.e., Q). The frequency of the first and second sinusoidal signals is chosen to be slightly lower than the carrier frequency $f_c$ of the desired signal 105 that is contained in the RF signal 207 such that the downconverted desired signal 120b falls at a pre-determined IF.

Figure 2:
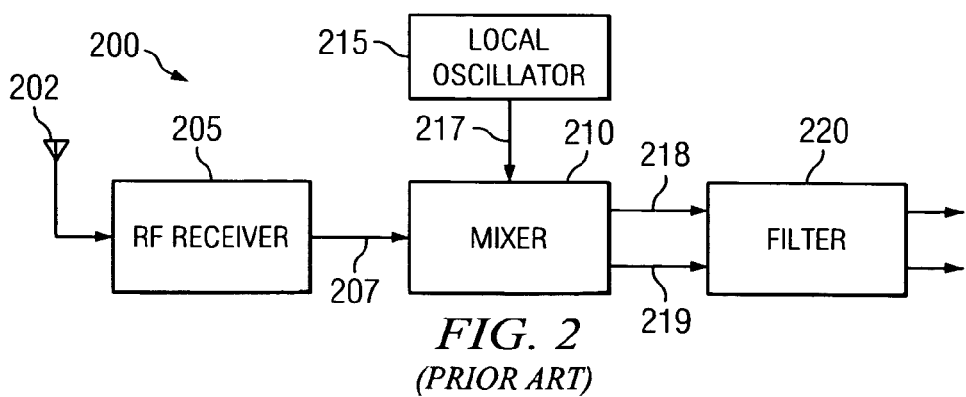
FIG. 2 is a schematic illustration of a prior-art example low-IF quadrature receiver.
Figure 3:
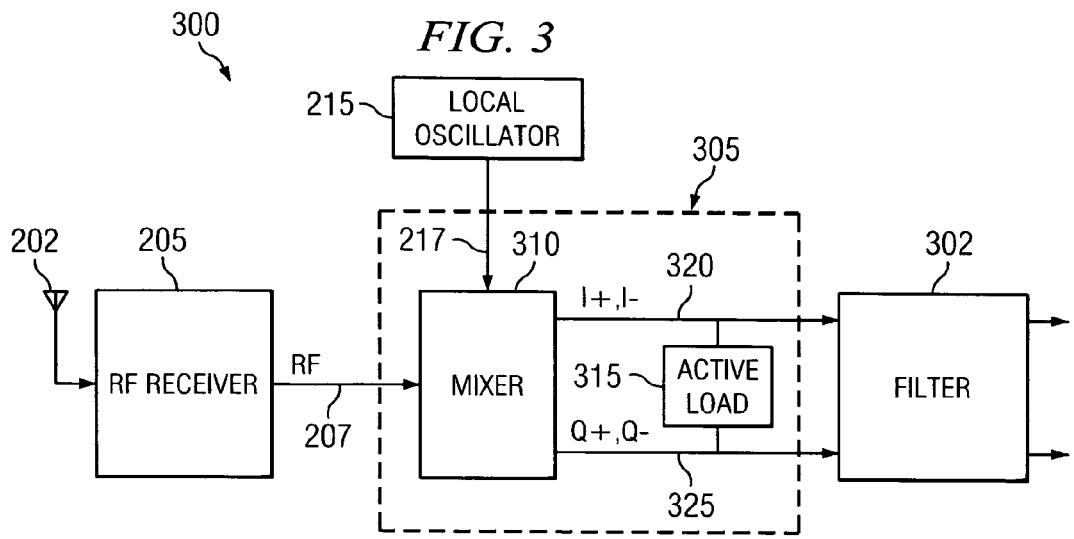
FIG. 3 is a schematic illustration of an example low-IF quadrature receiver that contains an integrated image-rejection quadrature mixer constructed in accordance with the teachings of the invention.

The active load 315 of the illustrated example of FIG. 3 replaces a portion of a passive network that is typically part of the filter 220 of FIG. 2. Using active devices (e.g., transistors), the active load 315 presents an impedance that varies with frequency. Thus, the active load 315 provides an image-rejection filter response, thereby reducing image-rejection, linearity, and/or dynamic requirements for blocks following the LIFQR 300 (e.g., the filter 302). The image-rejection filter response also substantially reduces the signal level of the interfering signal 130b present on the outputs 320 and 325 of the mixer 310. Thus, by integrating the active load 315 into the mixer 310 (i.e., knowing with certainty that the active load 315 is present), the dynamic range, linearity and/or overhead requirements for the mixer 310 are reduced. As is discussed in detail below in connection with FIG. 4, the active load 315 of the illustrated example of FIG. 3 is implemented as a first order cross-coupled complex filter. However, persons of ordinary skill in the art will recognized that other suitable methods and techniques for implementing the active load 315 could be used. For example, a higher order complex filter, one or more real filters, etc. could be used to implement the active load 315.

Figure 4:
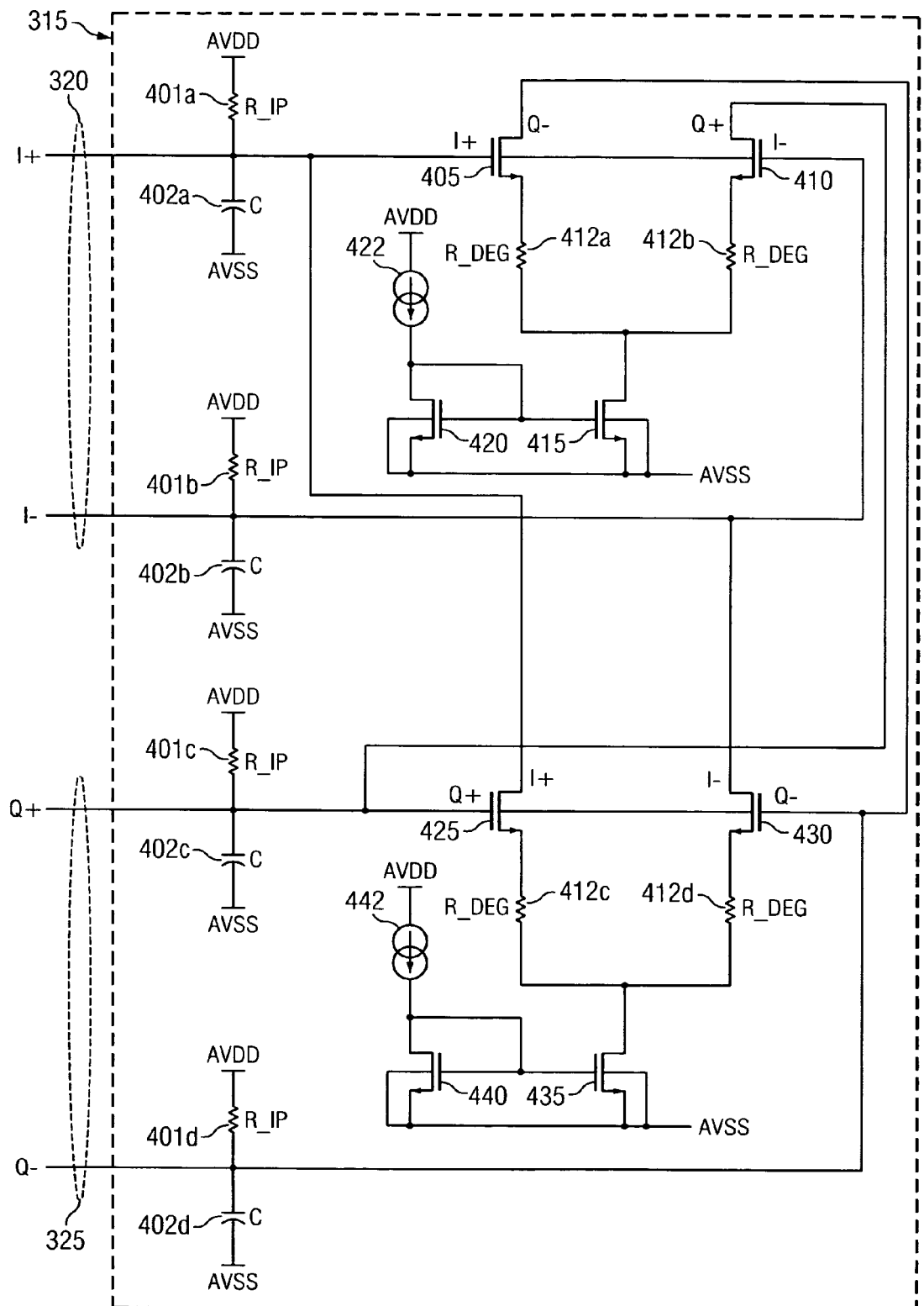
FIG. 4 is a schematic illustration of an example manner of implementing the active load of FIG. 3.

FIG. 4 is a schematic illustration of an example manner of implementing the active load 315 of FIG. 3. The illustrated example active load 315 provides an image-rejection filter response to suppress an unwanted minor signal. In the example of FIG. 4, the active load 315 provides a band-pass filter response defined by a bandwidth and a center frequency. To control the bandwidth of the image-rejection filter response, the example active load 315 includes a plurality of resistors 401a-d and a plurality of capacitors 402a-d. Each of the resistors 401a-d have substantially equal resistances R_IP. Each of the capacitors 402a-d substantially equal capacitance C. The values R_IP and C are selected to determine the bandwidth of the image-rejection filter response. (However, the value of C may be constrained by design considerations (e.g., an area of the silicon substrate required to implement the capacitors 402a-d).) For example, the 3 dB point of the filter response can be expressed mathematically as shown in Equation 3.

$$F_{3dB} = \frac{1}{2 \cdot \pi \cdot R\_IP \cdot C} \quad \text{(Equation 3)}$$

To control the center frequency of the image-rejection filter response, the example of FIG. 4 includes a first differential pair (constructed with transistors 405 and 410) and a second differential pair (constructed with transistors 425 and 430). To create a complex filter (i.e., a filter that can have a different transfer characteristic for positive and negative frequencies), the first and second differential pairs are cross-coupled to the differential in-phase signal 320 (i.e., I+ and I−) and the differential quadrature signal 325 (i.e., Q+ and Q−) as shown in FIG. 4. An effective transconductance Gm (including degeneration) of the first and second differential pairs determines the center frequency of the filter response. For example, the center frequency of the filter response can be mathematically expressed as shown in Equation 4, where Gm is the effective transconductance of the first and second differential pairs, and C is the capacitance of the capacitors 402a-d discussed earlier.

$$F_{IF} = \frac{Gm}{2 \cdot \pi \cdot C} \quad \text{(Equation 4)}$$

Figure 5:
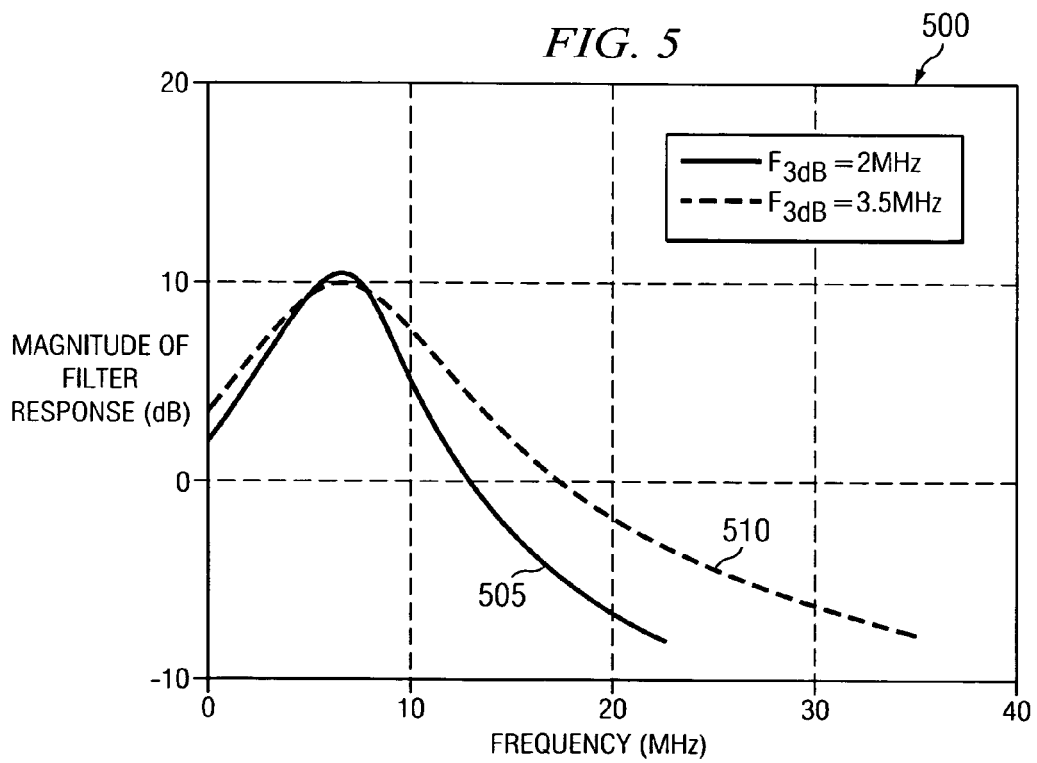
FIG. 5 is a graph illustrating example complex filter responses for the complex filter of FIG. 4.

Using a pre-determined $F_{IF}$ (the intermediate frequency for the example low-IF quadrature receiver 300), a pre-determined bandwidth of desired signal 105 (i.e., $F_{3\ dB}$), and an acceptable range of capacitances, the values for R_IP, C, and Gm can be determined, for example, by solving for R_IP C, and gm in Equations 3 and 4. FIG. 5 contains a graph 500 illustrating two example band-pass filter responses. Both responses are appropriate for a low-IF wideband code division multiple access (CDMA) (W-CDMA) receiver. A first curve 505 represents a filter response wherein $F_{IF}$=6 MegaHertz (MHz) and $F_{3\ dB}$2 MHz. This filter response 505 provides 17.6 dB suppression for an interfering signal located 15 MHz away from $F_{IF}$. A second curve 510 represents a filter response wherein $F_{IF}$6 MHz and $F_{3\ dB}$3.5 MHz. This filter response 510 provides 13 dB suppression for the same interfering signal.

The effective transconductance Gm for the first and second differential pairs of FIG. 4 is set by selecting a resistance value R_DEG for the resistors 412a, 412b, 412c, and 412d and by controlling a respective tail current of the first and second differential pairs. In particular, the effective transconductance Gm can be expressed mathematically as $$Gm = \frac{gm}{1 + gm \cdot R\_DEG},$$

where gm is the inherent transconductance of the differential pair. The inherent transconductance gm is determined by the tail current of the differential pair. To control the tail current of the first differential pair, the example of FIG. 4 includes a first well-known prior-art current mirror constructed with transistors 415 and 420, and a variable current source 422. The strength of the variable current source 422 is selected to determine the tail current of the first differential pair and, thus, the inherent transconductance gm. Likewise, the example of FIG. 4 includes a second current mirror constructed with transistors 435 and 440, and a variable current source 442 to control the inherent transconductance gm for the second differential pair.

Having determined the necessary value of effective transconductance Gm (as discussed above), a current provided by the variable current sources 422 and 442 and a resistance value R_DEG can be appropriately chosen using any well-known design technique. For instance, in the example of FIG. 4, the currents for the variable current sources 422 and 442 are chosen to be 10 micro-amperes (thus determining the inherent transconductance gm of each differential pair) and the resistance value R_DEG is determined to provide the required effective transconductance Gm for the first and second differential pairs.

The quadrature mixer 310 can be implemented using any of a variety of well-known techniques. FIG. 6 shows an example manner of implementing the quadrature mixer 310 of FIG. 3 that is appropriate for devices using a relatively high supply voltage (e.g., greater than 2.8 volts). It will be readily apparent to persons of ordinary skill in the art that other example manners of implementing the quadrature mixer 310 could be used. For example, a Gilbert Cell double balanced mixer could alternatively be employed. Further, for lower supply voltages, other implementations may be more appropriate. For example, using a simple transconductance stage followed by a passive mixer stage might be more appropriate in such circumstances.

The example circuit of FIG. 6 includes two well-known prior-art Gilbert single cell mixers 605 and 610. The first Gilbert single cell mixer 605 of FIG. 6 is constructed using three transistors 615, 620 and 625, and two load resistors 630 and 635. In the example of FIG. 6, the RF signal 207 is applied to the transistor 615 which performs a voltage to current conversion. The transistors 620 and 625 perform a multiplication function, multiplying a linear RF signal current from the transistor 615 with the differential first sinusoidal signal (that is part of the sinusoidal signal 217) applied to the transistors 620 and 625 as shown in FIG. 6. The two load resistors 630 and 635 form a current to voltage transformation generating the differential in-phase output signals 320 (i.e., I+ and I−). Likewise, the second Gilbert single cell mixer 610 multiplies the RF signal 207 with the differential second sinusoidal signal (that is also part of the sinusoidal signal 217) providing the differential quadrature output signals 325 (i.e., Q+ and Q−).

From the foregoing, persons of ordinary skill in the art will further appreciate that the above disclosed methods and apparatus achieve significant simplifications in the design and implementation of low-IF quadrature receivers. These simplifications are achieved by integrating a mixer and an active load onto a common silicon substrate. Further, the disclosed methods and apparatus reduce the complexity of filtering and signal processing that may be required subsequent to the integrated image-rejection quadrature mixer.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An image-rejection quadrature mixer comprising:
   an input terminal;
   a first pair of output terminals including an I+ terminal and an I− terminal;
   a second pair of output terminals including a Q+ terminal and a Q− terminal;
   a mixer coupled between the input terminal and the first and second pairs of output terminals, the mixer to form from a radio frequency signal coupled to the input terminal a diffential in-phase signal at the first pair of output terminals and a differential quadrature signal at the second pair of output terminals; and
   an active load coupled between the first and second pairs of output terminals, the active load to present a frequency-dependent impedance to the mixer to control an image-rejection response of the mixer, the mixer and the active load being integrated on a common silicon substrate, the active load comprising:
   first and second current mirrors;
   a first differential pair of transistors including a first transistor and a second transistor, the first transistor having a first gate coupled to the I+ terminal, a first source coupled to the Q− terminal, and a first drain coupled to the first current mirror, the second transistor having a second gate coupled to the I+ terminal, a second source coupled to the Q− terminal, and a second drain coupled to the first current mirror; and
   a second differential pair of transistors including a third transistor and a fourth transistor, the third transistor having a third gate coupled to the Q+ terminal, a third source coupled to the I+ terminal, and a third drain coupled to the second current mirror, the fourth transistor having a fourth gate coupled to the Q− terminal, a fourth source coupled to the I− terminal, and a fourth drain coupled to the second current mirror; wherein the first and second differential pairs have effective transconductances based on tail currents of the first and second current mirrors, and a center frequency of the image-rejection response being based on the effective transconductances.

2. An image-rejection quadrature mixer as defined in claim 1, wherein the active load comprises a complex filter.

3. An image-rejection quadrature mixer as defined in claim 1, wherein the active load further comprises:
   a first resistor coupled between the I+ terminal and a first supply signal;
   a first capacitor coupled between the I+ terminal and a second supply signal;
   a second resistor coupled between the I− terminal and the first supply signal;
   a second capacitor coupled between the I− terminal and the second supply signal;
   a third resistor coupled between the Q+ terminal and the first supply signal;

a third capacitor coupled between the Q+ terminal and the second supply signal;

a fourth resistor coupled between the Q− terminal and the first supply signal; and a fourth capacitor coupled between the Q− terminal and the second supply signal, the first, second, third and fourth resistors, and the first, second, third and fourth capacitors being sized to control a bandwidth of the image-rejection response.

4. An image-rejection quadrature mixer as defined in claim 1, wherein the active load further comprises:

a first capacitor coupled between the I+ terminal and a second supply signal;

a second capacitor coupled between the I− terminal and the second supply signal;

a third capacitor coupled between the Q+ terminal and the second supply signal;

a fourth capacitor coupled between the Q− terminal and the second supply signal, the first, second, third and fourth capacitors and the first and second current mirrors being sized to control the center frequency of the image-rejection response.

5. An image-rejection quadrature mixer as defined in claim 1, wherein the image-rejection response determines at least one requirement for the mixer.

6. An image-rejection quadrature mixer as defined in claim 5, wherein the at least one requirement comprises at least one of a signal headroom, a dynamic range, a power consumption, a physical dimension, a heat dissipation, an image rejection characteristic, a linearity characteristic, a signal-to-noise characteristic, and/or a noise characteristic.

7. A quatrature receiver comprising:

an input terminal:

first and second pairs of output terminals;

first and second pairs of intermediate terminals;

a mixer coupled between the input terminal and first and second pairs of intermediate terminals, the mixer to form from a radio frequency signal coupled to the input terminal a differential in-phase signal at the first pair of intermediate terminals, and a differential quatrature signal at the second pair of intermediate terminals; an active load coupled between the first and second pairs of intermediate terminals, the active load to present a frequency-dependent impedance to the mixer to control an image-rejection response of the mixer, the mixer and the active load being integrated in a package; and a filter coupled between the first and second pairs of intermediate terminals and the first and second pairs of output terminals, wherein the active load comprises:

a first differential pair of transistors, each of the transistors in the first differential pair having a gate coupled to a respective one of the first pair of intermediate terminals, and each of the transistors in the first differential pair having a source coupled to a respective one of the second pair of intermediate terminals; and a second differential pair of transistors, each of the transistors in the second differential pair having a gate coupled to a respective one of the second pair of intermediate terminals and a source coupled to a respective one of the first pair of intermediate terminals.

8. An apparatus as defined in claim 7, wherein the mixer and the active load are implemented on a first silicon substrate, and the filter is implemented on a second silicon substrate different from the first silicon substrate.

9. An apparatus as defined in claim 7, wherein the active per query load further comprises:

a first current mirror in circuit with the first differential pair of transistors;

first and second resistors in circuit with the first differntial pair and the first current mirror;

a first capacitor coupled to a first one of the gates of the first differential pair; and a second capacitor coupled to a second one of the gate of the second differential pair, wherein the current mirror, the first and second resistors and the first and second capacitors are selected to control a center frequency of the image-rejection response.

10. A method to improve image rejection comprising:

downconverting a received signal to produce a diffential in-phase signal and a differential quadrature signal in a first device, the differential in-phase signal having a first voltage and a second voltage, the differential quadrature signal having a third voltage and a fourth voltage;

inputting the first and second voltages to respective gates of a first differential pair of transistors in the first device;

inputting the third and fourth voltages to respective sources of the first differential pair of transistors;

employing a first current mirror in the first device to control a tail current of the first differential pair of transistors;

inputting the third and fourth voltages to respective gates of a second differential pair of transistors in the first device;

inputting the first and second voltages to respective sources of the second differential pair of transistors; and employing a second current mirror in the first device to control a tail current of the second differential pair of transistors, wherein the first and second differential pairs have an effective transconductance based on the tail currents controlled by the first and second current mirrors, and a center frequency of an image-rejection response of the first device is based on the effective transconductance.

* * * * *